US007488379B2

(12) United States Patent
Vary

(10) Patent No.: US 7,488,379 B2
(45) Date of Patent: Feb. 10, 2009

(54) SNAP LINE AND METHOD

(76) Inventor: William J. Vary, 1434 W. 6th St., Nevada, IA (US) 50201

( * ) Notice: Subject to any disclaimer, the term of this patent is extended or adjusted under 35 U.S.C. 154(b) by 0 days.

(21) Appl. No.: 11/828,912

(22) Filed: Jul. 26, 2007

(65) Prior Publication Data

US 2008/0016710 A1 Jan. 24, 2008

Related U.S. Application Data

(63) Continuation of application No. 10/684,243, filed on Oct. 13, 2003.

(51) Int. Cl.
*C09D 1/00* (2006.01)
*C09D 13/00* (2006.01)

(52) U.S. Cl. ................................ 106/31.01; 106/31.09

(58) Field of Classification Search ............. 106/31.01, 106/31.09; 33/414
See application file for complete search history.

(56) References Cited

U.S. PATENT DOCUMENTS

| | | | |
|---|---|---|---|
| 997,831 A | | 7/1911 | Kiso |
| 2,398,805 A | | 4/1945 | Pomeroy |
| 3,672,974 A | | 7/1972 | Tomlinson |
| 3,876,487 A | | 4/1975 | Garrett et al. |
| 4,792,357 A | * | 12/1988 | Bier ........................... 106/600 |
| 4,883,538 A | * | 11/1989 | Marlow et al. ......... 106/287.13 |
| 5,465,494 A | | 11/1995 | Johnston |
| 5,470,029 A | | 11/1995 | Dufour |
| 5,514,176 A | | 5/1996 | Bosley, Jr. |
| 5,683,055 A | | 11/1997 | Dufour |
| 6,079,112 A | | 6/2000 | Love |
| 6,203,602 B1 | | 3/2001 | Rangell |
| 6,345,448 B1 | | 2/2002 | Chontos |
| 6,578,274 B1 | | 6/2003 | Tango et al. |
| 6,915,587 B1 | * | 7/2005 | Scillia et al. .................. 33/414 |
| 2002/0026723 A1 | | 3/2002 | Savalia |
| 2003/0221325 A1 | | 12/2003 | Dekort |
| 2005/0076520 A1 | * | 4/2005 | Vary ........................... 33/414 |
| 2006/0122323 A1 | | 6/2006 | Dumont et al. |
| 2006/0194007 A1 | | 8/2006 | Ishii et al. |
| 2007/0289495 A1 | * | 12/2007 | Cray et al. ............. 106/287.14 |

* cited by examiner

*Primary Examiner*—Helene Klemanski
(74) *Attorney, Agent, or Firm*—Moore & Hansen, PLLP

(57) ABSTRACT

A snap line for use in applying powdered material to a surface. The line comprises at least one strand of material that has been coated with water repellent material. The line may be used in conjunction with powder that has also been coated with water repellent material. The line and the powder enable a user to apply lines to wet or damp surfaces in a normal fashion.

16 Claims, 1 Drawing Sheet

SNAP LINE AND METHOD

FIELD OF THE INVENTION

The present invention relates to construction equipment. More particularly, the present invention relates to equipment that is used to lay out dimensional or building lines for workers in the construction industry.

BACKGROUND OF INVENTION

Snap lines have been used in the construction industry for many years for laying out building or dimensional lines. They are easy to use, accurate, and inexpensive. Typically, a snap line is tautly held adjacent or slightly above a surface that is to be marked. The line is then pulled away from the surface and released so that it strikes against the surface, leaving a residual line of powdered material, such as chalk. Over the years, snap line technology has evolved; powdered material is now available in colors other than blue, and housings are better able to retain and protect the powdered material from the elements.

One thing that has not changed over the years, however, is the use and operation of the snap line. That is, the snap line must still be positioned adjacent or slightly above a surface to be marked, pulled away, and then released so that it strikes against the surface to be marked. This works quite well for most surfaces. However, a drawback with existing snap lines is that they are ineffective when weather conditions are less than ideal.

As one may expect, conventional snap lines often do not operate as intended when conditions are wet or damp. Often, the powdered material adheres to the snap line and does not release when the line strikes the surface. Moreover, if some of the powdered material does manage to release from the line upon impact, it does not easily transfer to a surface to be marked, and if transfer does occur, the powdered material can be easily smeared and/or washed away. Thus, whenever wet conditions exist, layout work is essentially halted. This can be problematic in areas where wet conditions such as precipitation and high humidity are common.

SUMMARY OF THE INVENTION

A snap line for use in applying powdered material to a surface. The line comprises at least one strand of material that has been treated with water repellent material. The water repellant material may be applied to the line by conventional techniques and technologies, such as spraying and submersing. The line may be used with existing powdered materials such as the various colored chalks now in use, or it may be used in conjunction with powdered material that has also been treated with water repellent material. In combination, the treated line and powdered material enable a user to apply lines to wet or damp surfaces, or surfaces with shallow puddles thereon in a normal fashion. Advantageously, the treated line and/or powdered material may be used with most existing snap line.

Certain objects, features, and advantages of the present invention will become apparent from the following detailed description thereof taken in conjunction with the accompanying drawings, wherein like reference numerals designate like elements throughout the several views.

DETAILED DESCRIPTION OF THE INVENTION

Figure 1:
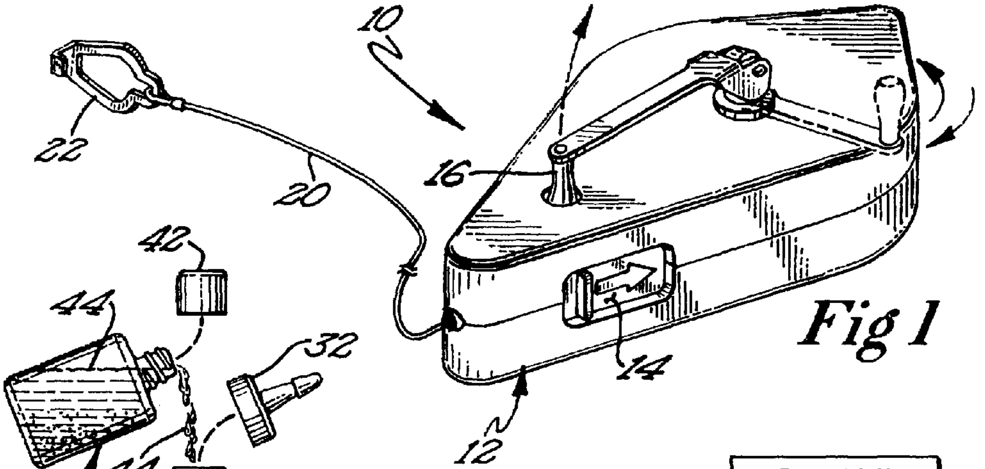
FIG. 1 is a perspective view of a snap line apparatus.

A typical snap line apparatus is depicted in FIG. 1. The apparatus 10 includes a housing 12 for holding powdered material and an access door 14 through which powdered material may be added without having to dismantle the housing. The apparatus also has a rotatable handle 16 that may be pivoted between storage and use positions. The handle 16 is operatively connected to a reel (not shown) about which a line 20 is wound. The line 20 includes an attachment ring 22, which is configured to facilitate attachment of the line 20 to a suitably positioned fastening element (also not shown).

The powdered material used in snap lines is usually available in bulk as a stand-alone product. In addition, powdered material is packaged in differently sized containers, of which a common size is 8-ounces. While the preferred powdered material used in the present invention comprises chalk and/or cementitious dye, it is understood that other powdered materials may be used without departing from the spirit and scope of the invention.

Figure 2:
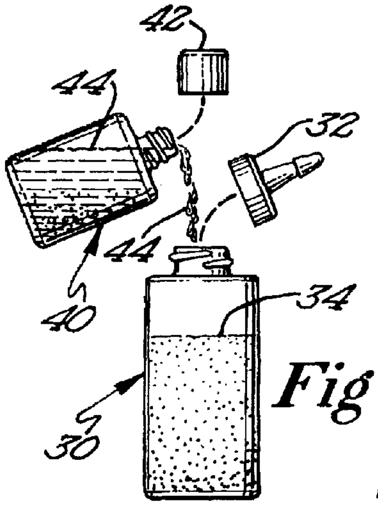
FIG. 2 is an illustration depicting a method by which powdered material of the present invention may be treated.

A process by which an improved powdered material may be treated is shown in FIG. 2. In the figure, a container 30 is depicted as having a cap 32, which has been removed to expose the powdered material 34 contained therein. Another container 40 is also depicted as having its cap 42 removed to expose water resistant material 44 contained therein. As shown, the water resistant material 44 is added to the container 30. After an effective amount of water resistant material 44 has been added, and prior to mixing, the container 30 may be closed by reattaching the cap 32. Although the treated powdered material may be produced using any one of a number of water resistant materials, it is preferred that the water resistant materials are silicone based. More preferably, it has been discovered that a particularly effective silicone-based water resistant material is sold by KIWI Brands under the name of Cavalier® Protect-All™.

Figure 3:
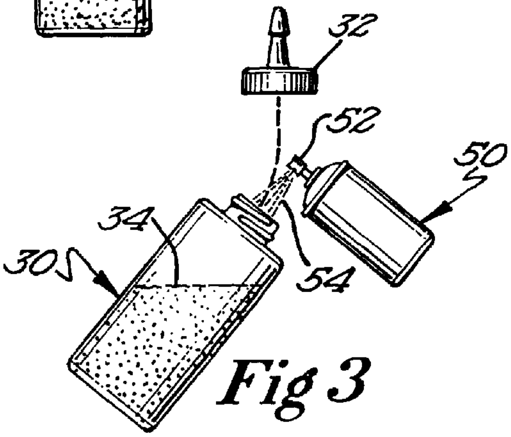
FIG. 3 is another illustration depicting another method by which powdered material of the present invention may be treated.

FIG. 3 illustrates another process by which an improved powdered material may be treated. Here, a container 30 is depicted as having a cap 32, which has been removed to expose the powdered material 34 contained therein. Another container 50 is depicted as having a nozzle 52, which directs water resistant material 54 (preferably Cavalier® Protect-All™) in a predetermined direction as it is expelled or propelled from the container 50. As shown, the water resistant material 54 is added to the container 30 by directing the water resistant material onto the powdered material. Preferably, enough water resistant material is applied to the powdered material so that the surface is effectively coated. Then, the cap 32 is replaced, and the container is agitated. Then, the cap 32 is removed and the steps of spraying, capping, and agitating are repeated until substantially all of the powdered material 34 has been treated.

As will be understood, the effective amount of water resistant material added to a container of powdered material will depend upon the size of the container. However, with an 8 (eight) ounce container of powdered material, it has been determined that an effective amount of water resistant material is in the range of about 0.5 to 4.0 ounces, and preferably in the range of about 1.0 to 3.0 ounces. It will also be understood that the aforementioned effective amount may differ between powdered materials manufactured by different companies, which may produce their powdered materials according to their own formulae, and manufacturing standards. Note that effective amounts may also be influenced by environmental conditions.

Figure 4:
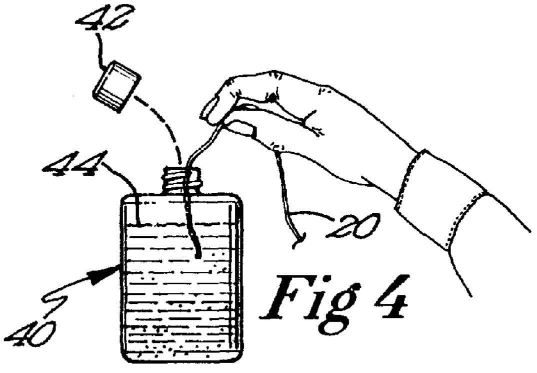
FIG. 4 is an illustration depicting a method by which a snap line of the present invention may be treated.

FIG. 4 illustrates a process by which an improved snap line is treated. Here, a container 40 is depicted as having its cap 42 removed to expose water resistant material 44 contained therein. A line 20 is then added to the container 40 so that it may be sufficiently coated. After the line 20 has been sufficiently coated, it is removed and allowed to air dry, or dried by applying gentle heat. Alternatively, water resistant material may be applied to a line 20 by spraying the water resistant material directly onto the line (similar to the method of application as taught in FIG. 3).

Figure 5:
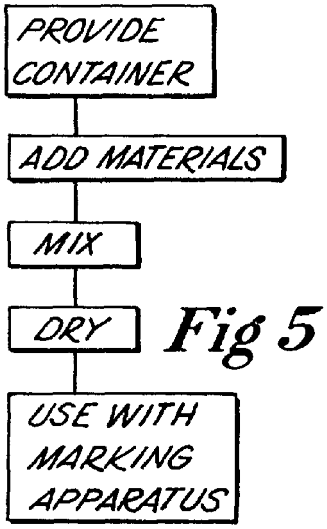
FIG. 5 is a schematic representation of process steps by which powdered material of the present invention may be treated; and, FIG. 6 is a schematic representation of process steps by which an improved snap line may be treated.

FIG. 5 illustrates a preferred method by which an improved powdered material may be treated. For this, a separate container may be provided, although it is preferred to use the container in which the powdered material was originally packaged. Then, the water resistant material is added to the container. As mentioned above, for an 8-ounce container, an effective amount of water resistant material is in the range of about 0.5 to 4.0 ounces, and preferably in the range of about 1.0 to 3.0 ounces. Then, the powdered material and the water resistant material are mixed. This can be achieved in numerous ways, such as, for example, by stirring, agitating, or by capping the container and vigorously shaking the container. Then, the mixture is dried. This step, too, can be achieved in numerous ways. For instance, the mixture could be allowed to air dry, or it could be gently heated. Finally, the mixture is combined with a snap line by adding it to a snap line apparatus.

It will be appreciated that the improved powdered material may be produced in a third container, if desired. In this variation, the water resistant material may be added first and then the powdered material may be added.

Figure 6:
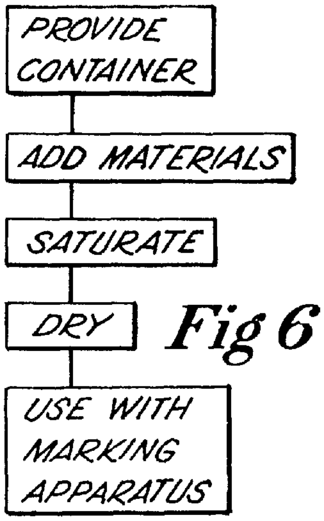

FIG. 6 illustrates a preferred method by which an improved snap line may be treated. For this, a separate container may be provided, although it is preferred to use the container in which the water resistant material was originally packaged. Then, the line is added to the container so that it is effectively coated. Then, the line is withdrawn from the container and dried. This can be achieved in a number of ways. For example, by air-drying, by forced air-drying, or by gently heating. Finally, the improved line installed into a snap line apparatus, where it may be combined with the improved powdered material.

It will be appreciated that the improved snap line may also be treated in a third container, if desired. In this variation, the untreated line may be added first and then the water resistant material may be added.

While preferred embodiments of the present invention have been shown and described, it should be understood that various changes, adaptations, and modifications may be made therein without departing from the spirit of the invention. For example, it is envisioned that the water repellency could be provided by polytetrafluoroethylene. Changes may be made in details, particularly in matters of shape, size, material, and arrangement of parts without exceeding the scope of the invention. Accordingly, the scope of the invention is as defined in the language of the appended claims.

What is claimed is:

1. A composition suitable for marking a surface, the composition comprising:
- a plurality of particles of a powdered material; and
- silicone, with the silicone covering surfaces of at least some of the plurality of particles of the powdered material.

2. The composition of claim 1, wherein the powdered material comprises chalk.

3. The composition of claim 1, wherein the powdered material comprises a mixture of chalk and a coloring dye.

4. The composition of claim 1, wherein the silicone is in the form of a silicone based water repellant material, wherein there is about 0.5 to about 4.0 ounces of silicone based water repellant for every 8 ounces of powdered material.

5. The composition of claim 1, wherein the composition comprises an effective amount of silicone such that the powdered material is substantially prevented from absorbing moisture.

6. The composition of claim 1, wherein there is about 1.0 to about 3.0 ounces of water repellant material for every 8 ounces of powdered material.

7. A composition for use with a snap line device, the composition comprising:
- chalk particles; and
- a silicone based water repellant material, with the silicone based water repellant material coating surfaces of at least some of the chalk particles.

8. The composition of claim 7, wherein there is from about 0.5 to about 4.0 ounces of silicone based water repellant for every 8 ounces of chalk particles.

9. The composition of claim 8, wherein there is from about 1.0 to about 3.0 ounces of water repellant material for every 8 ounces of chalk particles.

10. The composition of claim 8, further comprising a coloring dye.

11. The composition of claim 10, wherein the coloring dye comprises a plurality of particles of powdered material.

12. A composition suitable for marking a damp or wet surface, the composition comprising:
- a plurality of particles of powdered material; and
- silicone, with the silicone coating surfaces of at least some of the plurality of particles of powdered material.

13. The composition of claim 12, wherein the powdered material comprises chalk.

14. The composition of claim 12, wherein the powdered material comprises chalk and a coloring dye.

15. The composition of claim 14, wherein the coloring dye comprises a plurality of particles of powdered material.

16. The composition of claim 12, wherein the silicone is present in such quantity so as to effectively prevent at least some of the particles of the powdered material from absorbing moisture.

* * * * *